Aug. 6, 1957 J. O. WILLIAMS 2,801,795
TRIGONOMETRIC COMPUTING DEVICE
Filed Feb. 17, 1955 2 Sheets-Sheet 2

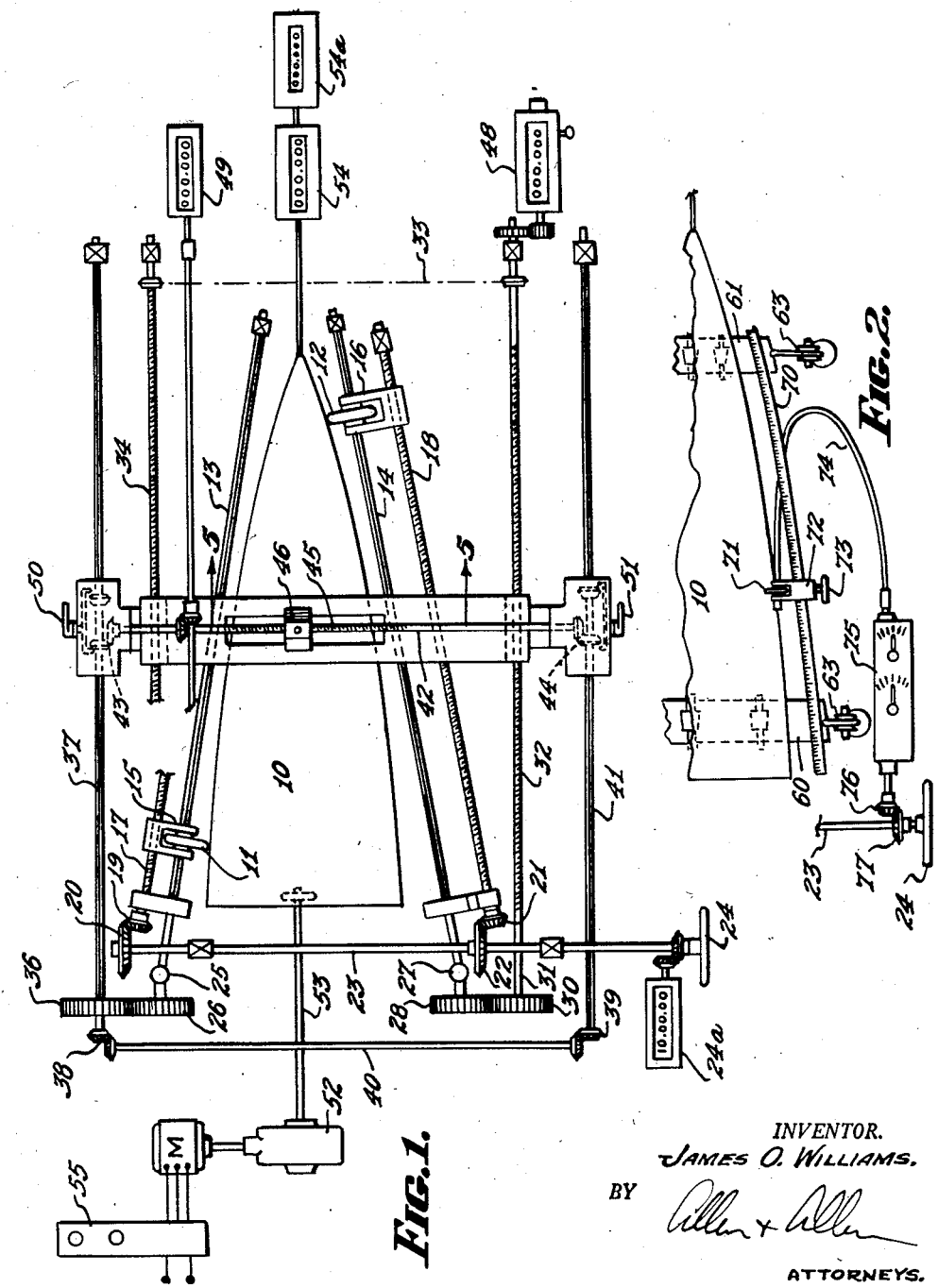

INVENTOR.
JAMES O. WILLIAMS,
BY
ATTORNEYS.

United States Patent Office 2,801,795
Patented Aug. 6, 1957

2,801,795

TRIGONOMETRIC COMPUTING DEVICE

James O. Williams, Waverly, Ohio

Application February 17, 1955, Serial No. 488,759

9 Claims. (Cl. 235—61)

This invention relates to a computing device and the like and more particularly to a device for use by draftsmen, surveyors, and the like, in solving various geometrical problems mechanically as well as graphically.

The calculating machine art is rather well advanced but the art has gone principally in the direction of accounting machines wherein the principal problems involve addition and subtraction. Not much work has been done on calculating machines fo rthe solution of geometric problems wherein multiplication is involved and wherein angles and the functions of angles are involved.

It is, therefore, a principal object of the present invention to provide a machine or apparatus by means of which various problems involving trigonometric calculations may be solved accurately and rapidly while at the same time the problem may be demonstrated graphically.

It is another object of the invention to provide a device as outlined which will be large enough in scale so that the results will be of a high degree of accuracy such that the apparatus will be valuable to surveyors in connection with such problems as running traverses and closing them and the like.

These and other objects of the invention which will be pointed out more specifically hereinafter or which will be apparent to one skilled in the art upon reading these specifications, I accomplish by that certain construction and arrangement of parts of which I shall now describe exemplary embodiments.

Reference is made to the drawings forming a part hereof and in which:

Figure 1 is a semi-diagrammatic plan view, with parts omitted, of the apparatus according to the invention.

Figure 2 is a fragmentary view similar to Figure 1 showing an attachment.

Briefly, in the practice of the invention I provide a generally bullet-shaped cam and means for rotating the cam. Two wheels are arranged to ride on the cam and be driven thereby and means are provided to adjust the position of these wheels longitudinally of the cam whereby the speed of rotation of the wheels with respect to the cam may be varied. The design of the cam is such that as the cam rotates, one of the wheels will be driven at a speed proportional to the sine of an angle and the other will be driven at a speed proportional to the cosine of the same angle. The rotation of the two wheels is transmitted to a stylus in such manner that the movement of the stylus in a line parallel to the axis of the cam is caused by the rotation of one of the wheels and the movement of the stylus in a direction normal to the axis of the cam is produced by other of said wheels.

Referring now in more detail to the drawings, the cam hereinabove referred to is shown at 10 and it will be seen to be bullet-shaped. The cam is constructed in such manner that if the length of the cam is considered to represent an angle of 90° and if that length is equally divided into single degrees and the degrees are further subdivided into minutes and seconds, the circumference of the cam at any position along its length, representing a particular angle, will be proportional to the sine of the angle and therefore of course to the cosine of its compliment.

Figure 6:
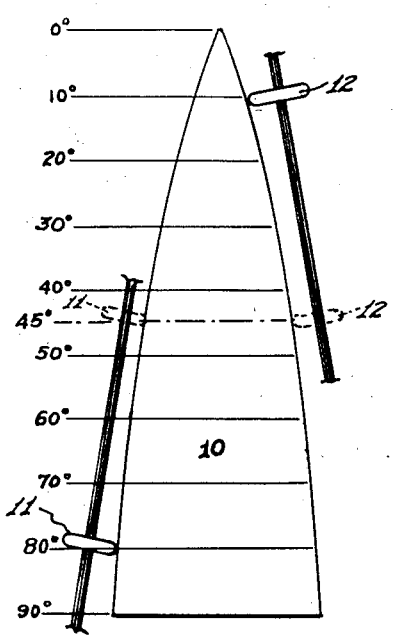
Figure 6 is a diagram useful in understanding the operation of the device.

Referring to Figure 6, the cam 10 has been shown as subdivided into units of 10°, and two wheels 11 and 12 are shown in contact with the cam, the wheel 11 at the 80° point and the wheel 12 at the 10° point. The wheel 11 at the larger end of the cam will be driven at a speed proportional to the sine of 80° which, of course, is the same as the cosine of 10°. The wheel 12 will be driven at the speed proportional to the sine of 10° or the cosine of 80°. It will be understood that as the wheel 11 is moved upwardly in Figure 6 and as the wheel 12 is moved downwardly (the wheels 11 and 12 always being concurrently moved in opposite directions at the same speed), when one of the wheels is at the 45° mark, the other wheel also will be at the 45° mark, at which time both wheels will indicate the sine and cosine of 45°.

Returning now to Figure 1, the wheels 11 and 12 are slidably mounted on the spline shafts 13 and 14 respectively, so that regardless of the position of the wheels 11 or 12 along the cam 10, the wheels will retain driving relationship respectively with the shafts 13 and 14.

The wheels 11 and 12 are straddled by the fork members 15 and 16 respectively, and the fork members 15 and 16 are provided with a threaded hole for the lead screws 17 and 18 respectively. Thus, by rotating the screw 18, the fork 16 is moved along the cam carrying with it the wheel 12, and similarly by moving the screw 17 the fork 15 is moved along the cam carrying with it the wheel 11. In the diagram as shown, it will be understood that the screws 17 and 18 are of opposite hand. The screw 17 is provided with a bevel gear 19 meshing with a bevel gear 20, and the screw 18 is provided with a bevel gear 21 meshing with a bevel gear 22. The gears 20 and 22 are on a common shaft 23 which may be rotated by a hand wheel 24. Thus, as the hand wheel 24 is turned the two screws 17 and 18 are moved concurrently the same amount and because the screws are of opposite hand, the forks 15 and 16 will be concurrently moved by the same amount in opposite directions. It will be understood that by the reversal of the position of the gear 20 with respect to the gear 19 or the gear 22 with respect to the gear 21, the same result could be accomplished with the screws 17 and 18 being of the same hand. An indicator 24a is geared to the shaft 23 and is calibrated in degrees, minutes and seconds of angle so that the indicator 24a will indicate the position along the cam of the wheels 11 and 12.

The rotation of the spline shaft 13 is transmitted through a universal joint 25 to a spur gear 26 while the rotation of the spline shaft 14 is transmitted to a universal joint 27 to a spur gear 28. The gear 28 meshes with the gear 30 on a shaft 31 which is threaded over the major portion of its length as at 32. Rotation of the shaft 32 is transmitted through a chain or suitable gear indicated by the broken line 33 to a similar screw shaft 34. The screw shafts 32 and 34 pass through threaded holes in a carriage 35 so that as the shafts 32 and 34 rotate, the carriage 35 is caused to move toward the right or left of Figure 1, depending upon the direction of rotation of the shafts 32 and 34. It will be clear therefore that the carriage 35 is caused to move toward the right or left of Figure 1 in proportion to the rotation of the wheel 12.

Figure 5:
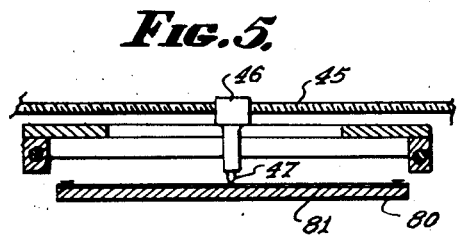
Figure 5 is a fragmentary cross-sectional view taken on the line 5—5 of Figure 1.

The gear 26 mentioned above drives a gear 36 on a shaft 37 and through bevel gearing at 38 which also drives the shaft 40 and through bevel gearing 39 it drives the shaft 41. The shafts 37 and 41 drive a shaft 42 through bevel gearing indicated at 43 and 44. The shaft 42 is threaded as at 45 and passes through a threaded hole in the element 46. The element 46 carries a scriber 47 (Figure 5). From the foregoing, it will be clear that the element 46 carrying the scriber will move in a vertical direction with respect to Figure 1 in proportion to rotation of the wheel 11.

At 48 there is shown an indicator driven from the shaft 32, which indicator will indicate the distance of travel of the carriage 35 in a direction parallel to the axis of the cam and at 49 there is provided an indicator driven by the shaft 37 which will indicate the travel of the element 46 in a direction normal to the axis of the cam 10.

As a matter of operational convenience, I have indicated the gearing at 43 and 44 as being a reversible gearing controllable by the handles 50 and 51.

The cam 10 itself is driven by a reversible motor M through a gear reducer 52 and a shaft 53, and an indicator at 54 indicates the revolutions of the cam. The indicator 54 is set back to zero after each operation, and a further indicator 54a gives a cumulative indication. The motor is under the control of a start-stop switch for each direction generally indicated at 55.

Figure 3:
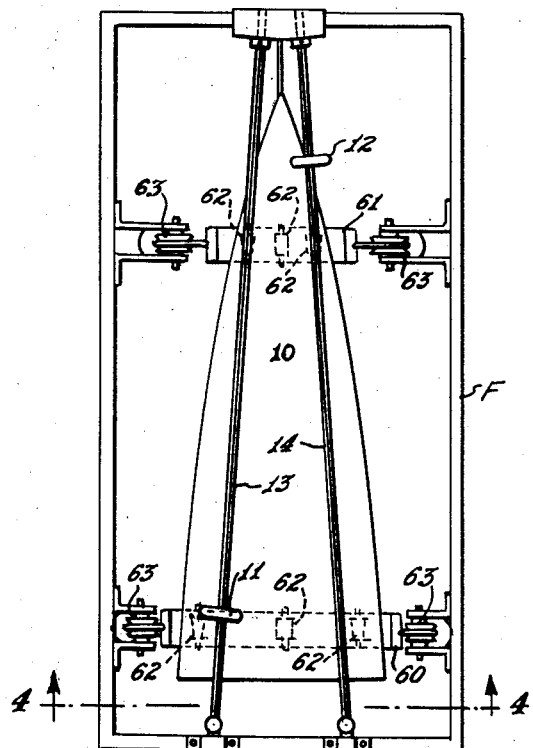
Figure 3 is a plan view similar to Figure 1 with other parts omitted and showing the mounting of the cam.
Figure 4:
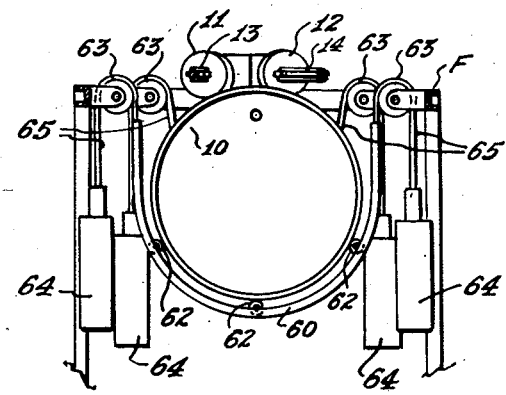
Figure 4 is a cross-sectional view taken on the line 4—4 of Figure 3.

Since the surface of the cam 10 is curved and since the wheels 11 and 12 move along spline shafts 13 and 14 whose position is fixed, means must be provided so that the wheels 11 and 12 will, at all times, remain in driving contact with the cam 10. Initially, the shafts 13 and 14 are disposed parallel to a mean tangent to the curvature of the cam. This, of course, is a compromise position. Continuous driving contact is achieved as will now be described. The cam rides in two or more cradles as best seen in Figures 3 and 4. The cradles are indicated at 60 and 61. These cradles are generally semi-circular in form and are provided with the tapered roller bearings 62, so as to provide for free rotation of the cam. The cradles are suspended from the machine frame F by means of cables and counterweights riding over pulleys 63 mounted in the frame. The counterweights are indicated at 64 and the cables at 65. The counterweights nicely counterbalance the weight of the cam so that when the rollers 11 and 12 bear with greater force against the surface of the cam, the cam is slightly depressed and this depression requires a minimum of force because of the counterweight system. Although the amount of movement is small, it will be understood that flexible drives are provided from the speed reducer 52 to the cam and from the cam to the indicator 54.

In Figure 2 there is shown an attachment useful for causing the scriber to move in a circular path. A bar 70 is secured to the two cradle members 60 and 61 and it may be graduated as shown. Preferably the bar 70 will be curved to conform to the curvature of the cam. A wheel 71 is rotatably mounted in a bracket 72 which is slidable on the bar 70 and whose position may be fixed by means of a set screw 73. The wheel 71 drives a flexible cable 74 and through a reversing and change speed gear box 75 it drives a bevel gear 76 meshing with a bevel gear 77 secured on the shaft 23, which carries the hand wheel 24. By means of the apparatus of Figure 2, it will be understood that as the cam 10 rotates, the position of the wheels 11 and 12 may be caused to be changed continuously.

While it is beyond the purview of the present application to give in detail an analysis of all the possible types of operations which may be accomplished by the present apparatus, it may be appropriate to give a simple illustrative problem.

Suppose it be desired to determine the value of the diagonal of a one inch square. With the scriber element at any desired position and all the indicators set to zero, the hand wheel 24 is turned to move the wheels 11 and 12 until the indicator 24a reads 45 00 00. As has been described above, the wheels 11 and 12 will then be shifted until they occupy the broken line position of Figure 6 and they will of course rotate at equal speeds. The switch 55 is then actuated to energize the motor M and to drive the cam 10. The operator will observe the indicators 48 and 49 until both of them read 1.000. At this point the motor is stopped and the indicator 54 is examined. It will be found that it now reads 1.414.

It will be obvious to one skilled in the art and familiar with the elements of geometry and trigonometry how other and more complex problems can be solved. It will also be clear how the apparatus can be used to plot surveys and traverses and the like. In this connection, it will be understood that the scriber is arranged to cooperate with a table 80 (shown only in Figure 5 and omitted from other figures for clarity) upon which a piece of paper 81 may be held by means of thumb tacks or the like, so that the scriber 47 will actually plot the problem on the paper 81. It will be clear that in constructing a closed traverse, the indicator 54a will give the total length of the traverse.

The effect of the attachment of Figure 2 will now also be clear. The wheel 71 will cause the angle value to change continuously while the scriber is advancing at a constant rate and its direction will, therefore, be continuously changing and in a complete movement of the wheels 11 and 12 from one end of the cam to the other, the scriber 47 will scribe a quadrant of a circle, the radius of which will depend upon the position of the wheel 71.

It will be understood that numerous modifications may be made without departing from the spirit of the invention and I, therefore, do not intend to limit myself except as pointed out in the claims which follow.

Having now fully described my invention, what I claim as new and desire to secure by Letters Patent is:

1. An apparatus of the character described, comprising a frame, a bullet-shaped cam rotatably and yieldably suspended in said frame, means for rotating said cam about its axis, a pair of cam follower wheels, a spline shaft mounting for each of said wheels, said spline shafts being generally parallel to mean tangents to said cam, common means for moving said wheels along said spline shafts concurrently in opposite directions such that one of said wheels moves from the larger end of said cam to the smaller end thereof, while the other moves from the smaller end to the larger end thereof, the yieldable suspension of said cam permitting said wheels in any position to ride on said cam, a carriage movable in a direction parallel to the axis of said cam, an operative connection between said carriage and one of said spline shafts whereby rotation of said one spline shaft produces movement of said carriage parallel to the axis of said cam, an element on said carriage movable in relation to said carriage in a direction normal to the direction of movement of said carriage, an operative connection between the other of said spline shafts and said element whereby rotation of said other spline shaft produces movement of said element with respect to said carriage in a direction normal to the direction of movement of said carriage.

2. Apparatus according to claim 1, wherein the length of the cam represents an angle of 90°, and the circumference of the cam at any point along its length, representative of an angle between 0° and 90°, is proportional to the sine of such angle.

3. Apparatus according to claim 1, wherein said cam is supported in a cradle and said cradle is suspended in said frame with counterweighting, whereby said cradle is capable of vertical movement to accommodate the linear movement of said wheels along their respective spline shafts.

4. Apparatus according to claim 1, wherein a table is secured to said frame immediately beneath said carriage, and wherein said element carries a scriber, whereby the movement of said element may be traced on a piece of paper resting on said table.

5. Apparatus according to claim 1, wherein an indicator is operatively connected to said cam to indicate the amount of rotation of said cam, and an indicator is operatively connected to said common means to indicate the setting of said wheels.

6. Apparatus according to claim 5, wherein said first indicator is resettable after each operation, and wherein a cumulative indicator is provided to indicate cumulatively the amount of rotation of said cam.

7. Apparatus according to claim 6, wherein an indicator is operatively connected to said carriage to indicate the linear movement thereof, and an indicator is operatively connected to said element to indicate the linear movement of said element with respect to said carriage.

8. Apparatus according to claim 1, wherein means are provided for driving said common means to vary continuously the positions of said wheels along said cam.

9. Apparatus according to claim 8, wherein a frame element is provided parallel to the surface of said cam, and a follower wheel is mounted on said frame element and is settable at a desired point along the surface of said cam, and wherein a driving connection is provided between said follower wheel and said common means.

References Cited in the file of this patent

UNITED STATES PATENTS

| | | |
|---|---|---|
| 1,785,241 | Bates | Dec. 16, 1930 |
| 2,390,613 | Oliphant | Dec. 11, 1945 |
| 2,627,180 | Barnes | Feb. 3, 1953 |